United States Patent [19]

Cobbledick

[11] 4,287,309

[45] Sep. 1, 1981

[54] POLYURETHANE FOAMS CONTAINING BROMINATED DIPHENYL ETHER

[75] Inventor: David S. Cobbledick, Kent, Ohio

[73] Assignee: The General Tire & Rubber Company, Akron, Ohio

[21] Appl. No.: 165,315

[22] Filed: Jul. 2, 1980

[51] Int. Cl.³ .............................................. C08G 18/14
[52] U.S. Cl. .................................... 521/114; 521/121; 521/123
[58] Field of Search ........................ 521/114, 121, 123

[56] References Cited

U.S. PATENT DOCUMENTS 3,909,464  9/1975  Anorga et al. ....................... 521/114
4,018,724  4/1977  Cobbledick .................. 260/45.75 W

OTHER PUBLICATIONS

Modern Plastics Encyclopedia, McGraw-Hill, N.Y., 1975-1976, pp. 200, 203 & 665.
Modern Plastics Encyclopedia, McGraw-Hill, N.Y., 1979-1980, pp. 666-667.

*Primary Examiner*—Maurice J. Welsh

[57] ABSTRACT

Flexible or semiflexible low density polyetherurethane foams containing antimony trioxide, zinc oxide and a brominated diphenyl ether or oxide having from 4 to 10 bromine atoms exhibit good flame retardant properties and also exhibit good resistance to smoldering.

10 Claims, No Drawings

POLYURETHANE FOAMS CONTAINING BROMINATED DIPHENYL ETHER

This invention relates to flame retardant polyurethane foams with improved resistance to smoldering such as cigarette smoldering.

OBJECTS

An object of this invention is to provide flexible or semiflexible, low density polyetherurethane foams which are not only flame retardant but also are resistant to smoldering such as cigarette smoldering.

Another object is to provide a method for making flexible or semiflexible, low density polyetherurethane foams which are not only flame retardant but also are resistant to smoldering such as cigarette smoldering.

These and other objects and advantages of the present invention will become more apparent to those skilled in the art from the following detailed description and working example.

SUMMARY OF THE INVENTION

According to the present invention it has been found that the use of a brominated diphenyl ether or oxide in a minor amount in conjunction with antimony trioxide and zinc oxide will provide flame retardant and smolder resistant flexible or semiflexible low density polyurethane foams.

Urethane foams containing polyvinyl chloride, antimony trioxide and zinc oxide are flame retardant but exhibit poor resistance to cigarette induced smoldering when tested according to Technical Bulletin 117, Dept. of Consumer Affairs, Bureau of Home Furnishings, State of California. However, it has been discovered that the use of a brominated diphenyl ether or oxide in place of the polyvinyl chloride provides foams with both good flame retardant properties and good resistance to smoldering such as cigarette induced smoldering.

DISCUSSION OF DETAILS AND PREFERRED EMBODIMENTS

The brominated diphenyl ether or oxide contains from 4 to 10 bromine atoms. Examples of such oxides or ethers are decabromodiphenyl ether, pentabromodiphenyl ether, octabromodiphenyl oxide and so forth and mixtures thereof. Pentabromodiphenyl ether or oxide is preferred. These brominated diphenyl ethers are used in an amount of from about 5 to 25 parts, preferably in an amount of from about 10 to 15 parts, by weight based on 100 parts by weight of the polyol(s) used in the polyurethane foam formulation.

The zinc oxide should be finely divided, for example, it should desirably have an average particle size of from about 0.05 to 200 microns, preferably from about 0.15 to 50 microns. It should not contain any appreciable amount of impurities which would adversely affect the foaming reaction or the properties of the resulting foams. The zinc oxide may be American process zinc oxide, French process zinc oxide, or zinc oxides produced by other processes. Zinc oxide is a well known material and is shown by:

(A) "Encyclopedia of Chemical Technology," Kirk and Othmer, The Interscience Encyclopedia, Inc., New York, Vol. 15, 1956, pages 262–266;
(B) "Zinc," Mathewson, Reinhold Publishing Corporation, New York, 1959, pages 346 to 385; and
(C) "Compounding Ingredients For Rubber," Third Edition, 1961, Rubber World, New York, pages 65, 72, 77, 80, 81 and 88.

The antimony trioxide, also, should be finely divided, for example, it should desirably have an average particle size of from about 0.05 to 200 microns, preferably from about 0.15 to 50 microns. It should not contain any deleterious materials which would adversely affect the foaming reaction or the properties of the resulting foam. The smaller particle sizes of antimony trioxide are most effective in the foam.

The polyurethane foam composition or formulation should contain from about 0.1 to 10 parts, preferably from about 0.2 to 5 parts, by weight of the zinc oxide and from about 0.5 to 15 parts, preferably from about 1 to 10 parts, by weight of the antimony trioxide ($Sb_2O_3$) per 100 parts by weight of the organic polyol(s) used in the polyurethane foam formulation.

Polyols used in making the flexible and low density (which includes semiflexible) polyurethane foam of the present invention are generally primary and secondary hydroxy-terminated polyoxyalkylene ethers having from 2 to 4 hydroxyl groups and a molecular weight of from about 1,000 to 10,000, preferably having 3 hydroxyl groups and a molecular weight of from about 2,000 to 5,000. They are liquids or are capable of being liquefied or melted for handling in the polyurethane foaming apparatus or machine.

Examples of polyoxyalkylene polyols include linear and branched polyethers having a plurality of ether linkages and containing at least two hydroxyl groups and being substantially free from functional groups other than hydroxyl groups. Among the polyoxyalkylene polyols which are useful in the practice of this invention are the polyoxypropylene, the polyoxypropylene-oxyethylene, and the polyoxybutylene glycols and triols. Among the polymers and copolymers that deserve some special mention are the ethylene oxide, propylene oxide and butylene oxide adducts of ethylene glycol, propylene glycol, diethylene glycol, dipropylene glycol, triethylene glycol, 2-ethylhexanediol-1,3, glycerol, 1,2,6-hexanetriol, trimethylolpropane, trimethylolethane, pentaerythritol, triethanolamine, triisopropanolamine, ethylenediamine, and ethanolamine and so forth. Linear and branched copolyethers of other alkylene oxides are also useful in making the foamed products of this invention as well as the polyoxypropylene diols, triols and tetrols endblocked with ethylene oxide to provide primary hydroxyl groups in the polymer. Block and random polyoxyalkylene polyols may be used.

An example of a useful type of polyetherpolyol is characterized by reference to the following general formula:

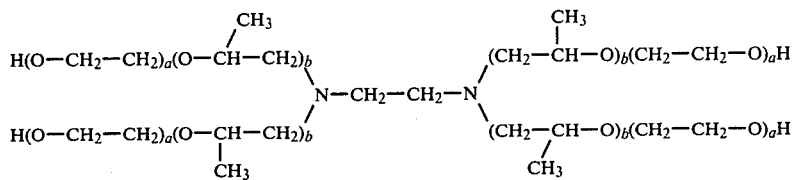

where in the formula the total of subscripts a and b represent positive integers in the range of from 20 to 100. Branched polyethers have the advantage of making possible cross-linking without the interaction of urea or urethane groups with the isocyanate groups. This has the advantage of making a larger proportion of the isocyanate used available for the evolution of carbon dioxide and the reducing of the overall amount of isocyanate that is required in the preparation of the foamed polymer. Mixtures of polyether polyols can be used.

Likewise, there can be used as polyols grafts of ethylenically unsaturated monomers such as acrylonitrile, methacrylonitrile, vinyl acetate, methyl acrylate and the like on the polyols and having the functionality and molecular weight as shown above. Such graft polyols and methods for making the same are shown in U.S. Pat. Nos. 3,304,273 and 3,383,351 to Stamberger, and in U.S. Pat. No. 3,294,711 to Von Bonin, where the monomer or monomers are polymerized with a free-radical or other catalyst in admixture with the polyol.

When desired, cross-linking materials having from 2 to 8 hydroxyl groups can be included in the foam formulation to increase cross link density and so forth. They have molecular weights of from about 60 to 600. Only small amounts of such materials are generally needed (about 0.3 to 10 mols per 100 mols of polyol). Examples of such crosslinking agents are glycol, diethylene glycol, propylene glycol, butane diol-1,4, dipropylene glycol, glycerol, trimethylolpropane, butane triols, hexanetriols, trimethylolphenol, various tetrols, such as erythritol and pentaerythritol, pentols, hexols, such as dipentaerythritol and sorbitol, as well as alkyl glucosides, carbohydrates, polyhydroxy fatty acid esters such as castor oil and polyoxy alkylated derivatives of poly-functional compounds having three or more reactive hydrogen atoms, such as, for example, the reaction product of trimethylolpropane, glycerol, 1,2,6-hexanetriol, sorbitol and other polyols with ethylene oxide, propylene oxide, or other alkylene epoxides or mixtures thereof, e.g., mixtures of ethylene and propylene oxides. Grafted crosslinkers can be prepared by the process of the aforementioned Stamberger and Von Bonin U.S. patents. Mixtures of crosslinkers can be used.

While any organic di or triisocyanate can be used in the practice of the present invention, diisocyanates are preferred, particularly when there is any considerable amount of branching in the polyol or crosslinker to avoid the formation of rigid foams. Moreover, diisocyanates which are liquid at ambient or room (about 25 degrees C.) temperature are preferred. Examples of suitable organic polyisocyanates to use are hexamethylene diisocyanate, trimethyl hexamethylene diisocyanate, 2,4,-tolylene diisocyanate, 2,6-tolylene diisocyanate, 4,4'-diphenylmethane diisocyanate, hydrogenated 4,4'-diphenylmethane diisocyanate or 4,4'-dicyclohexyl methane diisocyanate, polymeric forms of TDI, MDI and hydrogenated MDI, xylene diisocyanate and isophorone diisocyanate and the like. Mixtures of the polyisocyanates can be used. The tolylene diisocyanates are preferred.

The polyisocyanate is used in an amount sufficient to react with the active hydrogen atoms (as determined by the Zerewitinoff method, J.A.C.S., Vol. 49, p. 3181 (1927)) in the polyols, crosslinkers, water and any other active hydrogen-containing material in the polyurethane foam formulation to provide the desired degree of crosslinking, chain extension, urea groups, blowing and so forth to obtain the desired flexibility, strength and other physical properties.

Water is used as a blowing agent and is employed in amounts of from about 1.0 to 6.5 parts by weight per 100 parts by weight of the polyol.

The water should be substantially or essentially pure, that is, it should be free of impurities such as ions, sols, etc. of mineral, vegetable or synthetic origin and the like which would adversely affect the foaming action or the properties of the resultant polyurethane foam. Deionized, distilled or otherwise purified water should be employed.

If lower density and softer foams are desired there additionally can be added to the polyurethane foam fomulation separately or in admixture with one of the other components, i.e., polyol or polyisocyanate, etc., up to about 25 parts by weight of a fluorocarbon blowing agent per 100 parts by weight of the polyol. Examples of such blowing agents are those fluorine substituted aliphatic hydrocarbons which have boiling points between about −40 degrees C. and +170 degrees C., and which vaporize at or below the temperature of the foaming mass. The blowing agents include, for example, trichloromonofluoromethane, dichlorodifluoromethane, dichloromonofluoromethane, bromotrifluoromethane, chlorodifluoromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1,2,2-trifluoroethane, 1,1,1-trichloro-2,2,2-trifluoroethane, 2-chloro-nonafluoro-butane, hexafluorocyclobutane and octafluorocyclobutane. Still other easily vaporizable fluorocarbons can be used. Mixtures of the fluorocarbons can be used. Less desirable, blowing agents can be used in full or partial replacement of the fluorocarbons such as propane, butane, pentane, pentene, hexane and so forth, and mixtures thereof, particularly where precautions are taken to prevent explosions and/or fires or where removal of the gasses is provided.

Catalysts are added to accelerate the different urethane reactions. The chain-extension reaction, where the polyol reacts with the isocyanate to produce the polyurethane, is accelerated by tertiary amines and metalorganic catalysts. The tertiary amines, also, catalyze the gas-forming isocyanate-water reaction. Suitable tertiary amines are well known and include triethylene diamine, tetramethyl-butane diamine, triethylamine, N-methyl morpholine, N-ethyl morpholine, diethyl ethanolamine, N-coco morpholine, 1-methyl-4-dimethylamino ethyl piperazine, 3-methoxy-N-dimethylpropyl amine, N-N-diethyl-3-diethylamino propyl amine and dimethyl benzyl amine and the like and mixture thereof. The metal organic catalysts are also well known, tin catalysts being generally preferred, especially the divalent tin salts of carboxy acids having 2 to 18 carbon atoms. Examples of such catalysts include dibutyl tin dilaurate, stannous chloride, dibutyl tin di-2-ethyl hexoate, stannous octoate and stannous oleate.

The tin catalysts are used in an amount of from about 0.1 to 0.9 part by weight per 100 parts by weight of the polyetherpolyol. The amount of organic amine catalyst may comprise, per 100 parts by weight of organic polyol, about 0.05 to 3.2 parts by weight. In the case of the polyether polyols where the metal catalyst is used for the urethane-forming reaction, it is preferred to use only from about 0.05 to 1.1 part by weight of the amine catalyst. On the other hand, where the tertiary amine is taking care of both the foaming ($H_2O+NCO$) and network ($-ROH+NCO$) reactions, the tertiary amines should be used in somewhat larger amounts within the specified ranges. However, since some polyols may differ in residual acid content (from neutralization of KOH catalyst (used to form polyol) with acid) due to incomplete washing, filtering or ion-exchanging of the neutralized polyol, the amount of tertiary amine may necessarily have to be changed where large amounts of water are used as the primary blowing agent.

Surfactants or emulsifiers are generally necessary to provide the desired cell formation and growth. Polysiloxane-polyoxyalkylene block copolymers are preferred. Polysiloxane-polyoxyalkylene block copolymers are described in U.S. Pat. Nos. 2,834,748 and 2,917,480. The surfactant "non-hydrolyzable" polysiloxane-polyoxyalkylene block copolymers where the polysiloxane moiety is bonded to the polyoxyalkylene moiety through direct carbon-to-silicon bonds, rather than through carbon-to-oxygen-to-silicon bonds, can be used. Cyano containing polysiloxane-polyoxyalkylene copolymers also can be used as surfactants (U.S. Pat. No. 3,846,462); they also, are helpful in producing flame retardant polyurethane foam formulations. These copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group and (b) an alkali metal salt of a polyoxyalkylene polymer to a temperature sufficient to cause the polysiloxane polymer and the salt to react to form the block copolymer. Still other polysiloxane-polyoxyalkylene copolymers known to the art may be employed as well as silicones, turkey red oil and so forth. The surfactant is used in an amount of from about 0.3 to 2.5 parts by weight per 100 parts by weight of the polyether polyol.

The preparation of the polyurethane foams of the present invention can be formed by a process known in the art as the "one-shot" process or by a two step process involving, first, the preparation of a "prepolymer", the well known "semi-prepolymer" or "quasi-prepolymer" technique. There all or a portion of the polyol is reacted with all of the organic polyisocyanate, providing a reaction product which contains a high percentage of free isocyanate groups and which is reacted with the remaining portion of the hydroxyl-terminated polyol or a crosslinker, together with water, catalysts, ZnO etc. to form a rubbery, cellular, elastic or flexible product.

The polyurethane foams can be molded as such into the desired dimensions such as in the form of seats or seat cushions. They, also, may be made in the form of buns or slabs and then to cut or slit (slice) into sheets of the desired thickness which then may be cut to the desired configuration. If desired, the foam may be made into a log or the like and then peeled and cut.

For more information on the preparation of polyurethane foams please see "Encyclopedia Of Chemical Technology," Kirk-Othmer, Vol. 21, 2nd Ed., pages 56 to 106, Interscience Publishers a Division of John Wiley & Sons, Inc., New York, 1970; "Encyclopedia of Polymer Science And Technology," Vol. 15, pages 445 to 479, Interscience Publishers a division of John Wiley & Sons, Inc., New York, 1971 and Sounders and Frisch, "Polyurethanes," Chemistry and Technology, Part II. Technology, High Polymers, Vol. XVI, Interscience Publishers a division of John Wiley & Sons, Inc., New York, 1964.

To prevent discoloration of the foam during foam formation it is desirable to include in the foam formulation a zinc salt such as that shown in U.S. Pat. No. 4,018,724. The salt of this patent has the formula and is selected from the group consisting of

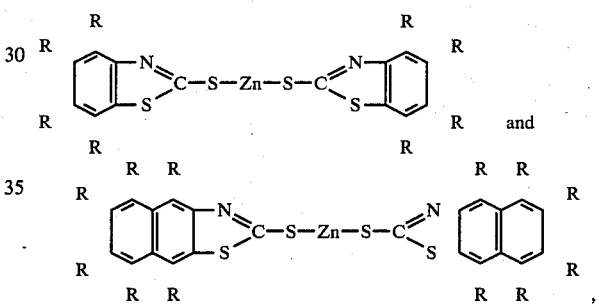

the Rs being the same or different, where R is —R', —OR', -halogen, -hydrogen, or -nitro group, R' being a $C_1$ to $C_{10}$ alkyl, cycloalkyl, aralkyl, alkaryl or aryl group, preferably said zinc salt has the formula:

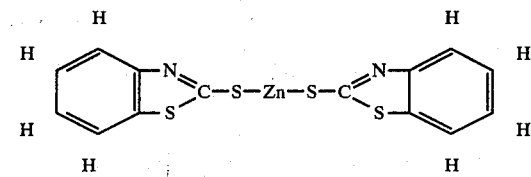

Thus, R can be hydrogen, methyl, ethyl, propyl, isopropyl, butyl, amyl, decyl, cyclohexyl, cyclobutyl, phenyl, cycloheptyl, tolyl, benzyl, xylyl, mesityl, cumyl, phenylethyl, phenylpropyl, phenyl butyl, methoxy, phenoxy, propoxy, ethoxy, butoxy, phenylpropoxy, methyl phenoxy, chlorine, bromine, fluorine, iodine, and/or nitro (—$NO_2$). See U.S. Pat. Nos. 2,102,547; 2,129,621; 2,170,670; 2,798,106; 2,754,303; and 3,043,847.

Preferably, the zinc salt is the zinc salt of 2-mercaptobenzothiazole and is available commercially as "ZETAX" (R. T. Vanderbilt Co., Inc.), "Pennac ZT" (Pennwalt Corp.), and "ZMBT" (American Cyanamide Co.).

The zinc salt preferably should be in finely divided form such as a powder and should be essentially free of impurities which would adversely affect the form or foaming operation. The amount of the zinc salt to use will vary from about 0.05 to 5.00, preferably from about 0.2 to 1.0, parts by weight per 100 parts by weight of the total polyol used in the foam formulation.

The following example will serve to illustrate the present invention with more particularity to those skilled in the art.

EXAMPLE

Flexible low density polyetherurethane foams were prepared by the "one-shot" method using the following formulations. The materials used and the results obtained are shown below:

| Materials | Parts by Weight | |
|---|---|---|
| | A | B |
| "Pluracol" 726[1] | 100.0 | 100.0 |
| Polyvinyl chloride resin | 12.0 | — |
| Pentabromodiphenyloxide | — | 12.0 |
| $Sb_2O_3$ | 4.5 | 3.0 |
| ZnO | 3.0 | 1.5 |
| $H_2O$ | 4.25 | 4.25 |
| Surfactant[2] | 1.3 | 1.3 |
| "Polycat" 77-50[3] | 0.24 | 0.24 |
| T-10[4] | 0.38 | 0.38 |
| TDI[5] | 59.6 | 59.6 |
| Density, lbs/cu. ft. | 1.53 | 1.52 |
| 12 Second Verticle burn | | |
| After flame, sec. | 0 | 0 |
| Burn length, in. | 2¼ | 2¼ |
| Char length, in. | 4¼ | 4¼ |
| Cigarette smolder[6] | | |
| Char loss, % | 33-38 | 3-7 |

Notes:
[1]Polyoxypropylene triol with OH number of 56, glycerol initiated. BASF Wyandotte.
[2]Polysiloxane-polyoxyalkylene surfactant. Union Carbide Corporation, L5740.
[3]50% tertiary amine in dipropylene glycol. Abbott Laboratories, Chemical Marketing Division.
[4]50% solution of stannous octoate in dibutyl phthalate. M & T Chemicals Inc.
[5]80/20 mixture of 2,4- and 2,6-isomers of tolylene diisocyanate.
[6]Proposed test method for screening flexible polyurethane foam relative to smoldering properties, June 23, 1978, Department Of Consumer Affairs, Bureau of Home Furnishings, 3435 Orange Grove Avenue, North Highland, California 95660. Technical Bulletin 117.

I claim:

1. In the method of making a flexible or semiflexible low density polyetherurethane foam using the one-shot or prepolymer process by the reaction of (A) a polyetherpolyol having from two to four hydroxyl groups and having a molecular weight of from about 1,000 to 10,000, (B) an organic polyisocyanate and (C) a blowing agent comprising water in admixture with (D) a surfactant, (E) a catalyst, (F) finely divided zinc oxide in an amount of from about 0.1 to 10 parts by weight per 100 parts by weight of said polyol, and (G) finely divided antimony trioxide in an amount of from about 0.5 to 15 parts by weight per 100 parts by weight of said polyol, the improvement comprising incorporating in the formulation prior to foaming a brominated diphenyl ether having from 4 to 10 bromine atoms in an amount of from about 5 to 25 parts by weight per 100 parts by weight of said polyol.

2. The method according to claim 1 where said zinc oxide is used in an amount of from about 0.2 to 5 parts by weight, said antimony trioxide is used in an amount of from about 1 to 10 parts by weight, said brominated diphenyl ether is used in an amount of from about 10 to 15 parts by weight and said polyetherpolyol has a molecular weight of from about 2,000 to 5,000 and has 3 hydroxyl groups.

3. The method according to claim 2 where said brominated diphenyl ether is pentabromodiphenyl ether.

4. A low density, flexible or semiflexible polyetherurethane foam, the ether moieties of said foam being derived from polyether polyols having a molecular weight of from about 1,000 to 10,000 and having from 2 to 4 hydroxyl groups containing, based on 100 parts by weight of said polyol, (I) finely divided zinc oxide in an amount of from about 0.1 to 10 parts by weight, (II) finely divided antimony trioxide in an amount of from about 0.5 to 15 parts by weight, and (III) from about 5 to 25 parts by weight of a brominated diphenyl ether having from 4 to 10 bromine atoms.

5. A foam according to claim 4 where said zinc oxide is present in an amount of from about 0.2 to 5 parts by weight, said antimony trioxide is present in an amount of from about 1 to 10 part by weight, said brominated diphenyl ether is present in an amount of from about 10 to 15 parts by weight and said polyetherpolyol has a molecular weight of from about 2,000 to 5,000 and has 3 hydroxyl groups.

6. A foam according to claim 5 where said brominated diphenyl ether is pentabromodiphenyl ether.

7. The method according to claim 1 where said formulation contains additionally from about 0.05 to 5.00 parts by weight of the zinc salt of 2-mercaptobenzothiazole per 100 parts by weight of said polyol.

8. The method according to claim 1 where said formulation contains additionally from about 0.2 to 1.0 part by weight of the zinc salt of 2-mercaptobenzothiazole per 100 parts by weight of said polyol.

9. A foam according to claim 4 where said foam contains additionally from about 0.05 to 5.00 parts by weight of the zinc salt of 2-mercaptobenzothiazole per 100 parts by weight of said polyol.

10. A foam according to claim 4 where said foam contains additionally from about 0.2 to 1.0 part by weight of the zinc salt of 2-mercaptobenzothiazole per 100 parts by weight of said polyol.

* * * * *